United States Patent [19]

Angell

[11] Patent Number: 4,606,670
[45] Date of Patent: Aug. 19, 1986

[54] FIXING RIGID INSERTS IN FLEXIBLE MATERIAL

[75] Inventor: Cyril N. E. Angell, Trowbridge, England

[73] Assignee: Avon Industrial Polymers Limited, Melksham, England

[21] Appl. No.: 499,160

[22] PCT Filed: Oct. 4, 1982

[86] PCT No.: PCT/GB82/00285
§ 371 Date: May 17, 1983
§ 102(e) Date: May 17, 1983

[87] PCT Pub. No.: WO83/01280
PCT Pub. Date: Apr. 14, 1983

[30] Foreign Application Priority Data

Sep. 20, 1982 [GB] United Kingdom ............... 8226755
Oct. 4, 1983 [GB] United Kingdom ............... 8130486

[51] Int. Cl.$^4$ .............................................. F16D 1/00
[52] U.S. Cl. ................................. 403/291; 403/50; 2/429; 128/206.23
[58] Field of Search .................. 2/429, 431, 441, 443, 2/440; 128/206.23, 206.15, 206.17, 206.15, 207.12; 403/50, 51, 291

[56] References Cited

U.S. PATENT DOCUMENTS

| | | |
|---|---|---|
| 1,856,879 | 5/1932 | Lufkin ................................ 2/431 X |
| 2,290,776 | 7/1942 | Stillwagon, Jr. .................. 403/50 X |
| 2,861,456 | 11/1958 | Soderberg ............................ 403/50 |
| 3,323,135 | 6/1967 | Miller ................................... 2/429 |

FOREIGN PATENT DOCUMENTS

| | | | |
|---|---|---|---|
| 1194397 | 11/1959 | France . | |
| 195783 | 5/1938 | Switzerland .................... | 128/206.23 |
| 504813 | 2/1939 | United Kingdom ........... | 128/206.23 |

*Primary Examiner*—Andrew V. Kundrat
*Attorney, Agent, or Firm*—William R. Hinds

[57] ABSTRACT

To achieve highly fluid-tight sealing of a rigid insert into an orifice in flexible material (101), the insert is made in two parts (103, 106) which can be pressed together with purely axial movement, one part deforming slightly relative to the other at least during the movement, until they adopt as a result of interengagement between them a relationship in which they exert a predetermined sealing pressure on the edge portion of the flexible material between their radially extending flanges (108, 109). A bead (102) may be accommodated in an oversize recess (122) in the flanges. A sub-assembly such as an eyepiece (111) is held fluid tight in one (103) of the parts. Detent means (107, 116) are designed to maintain a sealing contact even if the flexible material (101) or sealing ring (118) creep or set. Though the orifice has an endless edge it is not necessarily circular in outline.

15 Claims, 7 Drawing Figures

FIXING RIGID INSERTS IN FLEXIBLE MATERIAL

FIELD OF THE INVENTION

This invention relates to the fixing of rigid inserts in an aperture in flexible materials.

BACKGROUND OF THE INVENTION

Such inserts may comparatively readily be fixed permanently by moulding-in or permanent bonding, but when there is a requirement for removability or replacability problems arise in achieving a fixing which is at the same time fluid-proof and secure.

Such fixings have commonly been achieved by the use of spring clips or Jubilee Clip type devices both of which are broken rings of which the ends are drawn together—in the one case by the resilience of the ring material itself and in the other case by a screw linkage joining them. In both cases there is an area of flexible material which is underlying the broken part of the ring where a seal is not assured and in the case of the Jubilee Clip the tightening of the screw can cause distortion and creep of the flexible material underneath the clip as a result of the pressures applied.

SUMMARY OF THE INVENTION

The present invention seeks to achieve fixing of a rigid insert housed in an orifice in a flexible material whereby substantially uniform loading of the flexible material all the way around the margin of the insert is achievable without any necessary rotational movement between any of the parts involved. It is apparent therefore that the seal may be used around apertures which are not circular. In this specification however, purely for convenience, the term "radial" and "axial" will be used to denote respectively "directions inwardly and outwardly of the centre of the orifice" and "directions perpendicular to the general plane of the orifice".

The insert includes a composite of two parts, the first part of which has a radially directed flange and an axially directed wall, the flange of which is to lie over the flexible material. The other part of the ring has a radially directed flange and an axially directed surface which are respectively to over-lie the flexible material and to engage on the axial wall of the first part of the ring when the two parts are pressed in an axial direction together, thereby to squeeze axially the margin between the respective portions of the flexible material by virtue of the axial approach of the two radial flange faces of the two parts of the ring. Normally the insert will be supporting some element within the orifice rather than merely acting as a boundary for the orifice; and that element may be integral with the insert.

The two parts may form a frictional force fit together and additionally or alternatively may have detent means causing them to adopt a preferred axial relationship. One or more of the wall and the surface may be slightly tapered so that upon axial approach of the two parts one of the two may be distorted slightly so as to compress radially the layer of material lying radially adjacent to the periphery of the insert. Both parts are closed, endless, figures (not necessarily circular) corresponding to the outline of the orifice. The radial flange of one part may overlie the flexible material over one face of a discrete said element mounted by the insert, and the radial flange of the other part will overlie the flexible material over the opposite face of the element, so that pressure is exerted on a composite of flexible material/rigid element/flexible material by the two flanges. In this case, the flexible material into which the insert is secured is preferably formed with a margin for the reception of the insert which is generally S-shape in cross-section.

In a preferred version however, the flexible material is trapped and axially pressed directly between the flanges of the two parts.

In this version the radial flange and the radial surface may define together a constriction some distance from the axial wall. This forms a compartment with a reduced width slit opening around its radially outer circumference. With this embodiment the flexible material may have a bead around its aperture located in the compartment and subjected in that compartment to axial pressure while the material located immediately (radially) outwardly of the compartment is pressed in the constriction. Furthermore, there may be a further localized and radially narrow constriction exerted by a narrow ridge or lip on at least one of the flanges.

The insert is, in the present specific embodiment separate from the element it is to support in the flexible material. That element may be secured to the insert in a way analogous to the attachment of the flexible material to the insert. The axial wall has a seat and detent means projecting radially from it. The radially outer edge of the element is held between the stop and the detent by a third part, a ring which fits between the element and the detent, the detent being undersize for the third part.

In many applications it is highly desirable to maintain a fluid tight seal between the flexible material and the element. A fluid tight seal with the first and second rings is provided by the clamping of the flexible material between the first and second parts. Of course, if the element is integral with one of the parts of the insert, that suffices for the purpose. But in order to seal the insert to a separate element a sealing ring may be provided between the third part and the element and/or between the element and the stop.

Since the parts are all complete, unsplit rings although they should be made of a sufficiently stiff material to perform their fixing function it is advantageous if one or more of them is made of a material having a slight resilience, such as nylon or a polyacetal (e.g. Delrin, Registered Trade Mark). In one embodiment to be described for example the third component is substantially less rigid than the first and second since it has to be squeezed past an undersize detent at a time when the axial flange of the first part is substantially deprived of resilience by the positioning of the second part outside it. The more rigid ring(s) may, but need not, include reinforcing fibres. The invention has application to the retention of many different sorts of elements in orifices in flexible materials but clearly is of greater value where a high degree of fluid-tightness and reliability are needed.

DESCRIPTION OF THE DRAWINGS AND OF PARTICULAR EMBODIMENTS

Particular versions of an application of the invention to the insertion of elements into a respirator will now be described with reference to the accompanying drawings wherein.

Figure 1:
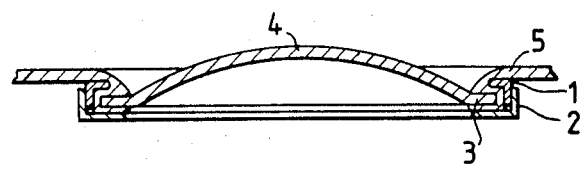
FIG. 1 is a diametrical section through a first version showing the features of the orifice of the flexible material and the parts of the insert.

FIG. 1 shows two parts 1 and 2 of a composite insert engaged around the marginal portion 3 of a transparent rigid element 4 in this case a glass eyepiece of a respirator. The rubber material 5 of the respirator itself forms a closed aperture into which the marginal portion 3 is fitted.

Figure 2:
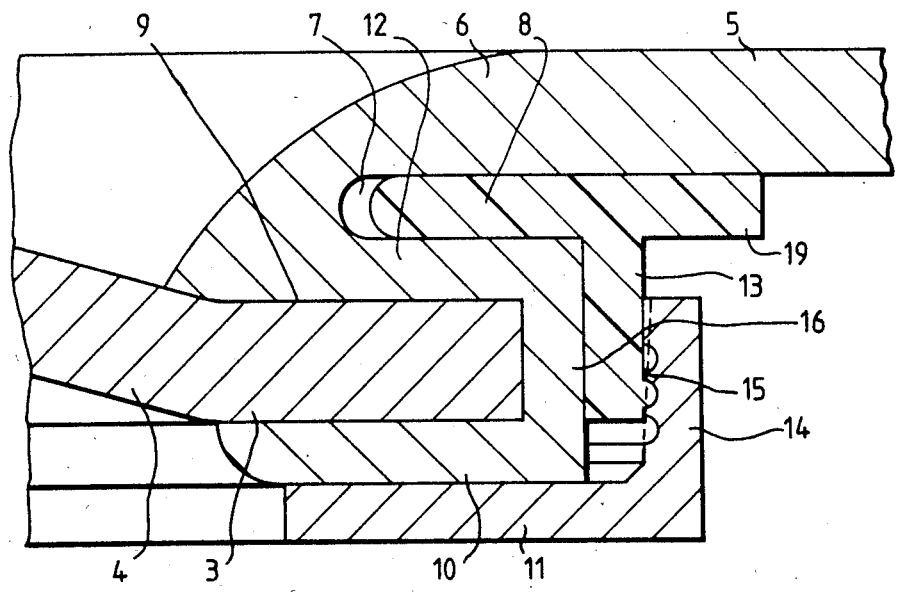
FIG. 2 is an enlarged partial view of FIG. 1.

Looking now at FIG. 2, it can be seen that the aperture in the flexible material 5 is defined by a generally S shape part when seen in cross-section, a first loop 6 of the S being continuous with the body of the respirator proper. A first inlet 7 of the S is for receiving a planar and generally radially directed flange 8 of the ring part 1 and the second loop 9 of the S is for receiving the marginal portion 3 of the rigid element. The third loop 10 of the S removed from the body is acted against by the generally planar and radial flange 11 of the secondary part 2. Although in a respirator the eyepieces are usually circular it is recalled once more that the invention is not restricted to circular inserts and can be applied to inserts and orifices having any closed configuration.

To compress the material of the end loop 10 of the S and also of its central loop 12 against the respective faces of the marginal portion 3 of the element 4, the two ring parts 1 and 2 are forced axially together, a movement which does not necessarily have any rotational component. This is achieved by providing on the ring parts axial walls 13 and 14 respectively the radially inner face of one being for engagement in a force fit with the outer face of the other.

Figure 3:
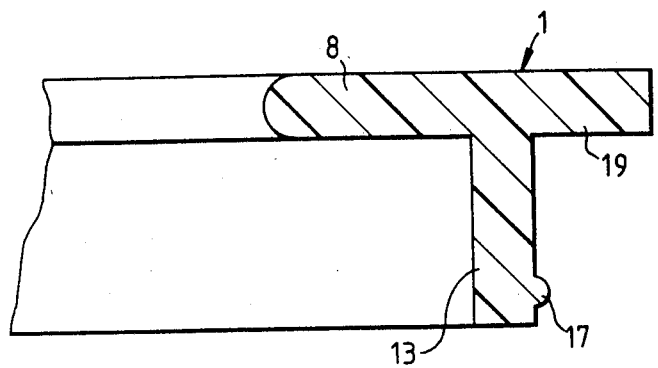
FIGS. 3 and 4 are detailed radial section views of two parts of the insert showing additionally detailed means on their inter-engaging portions.
Figure 4:
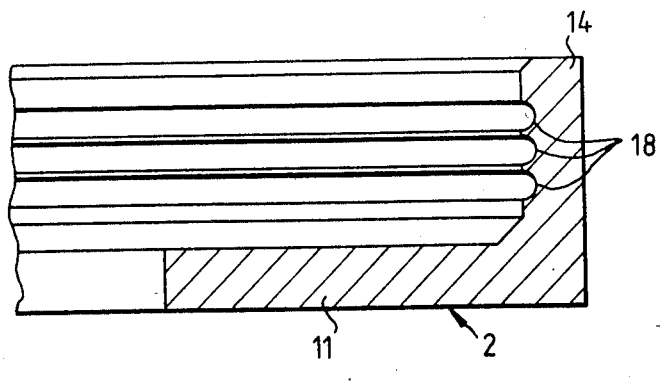

This force fitting may be achieved by a slight tapering of at least one of the respective faces as indicated at 15 FIG. 2 which has also the effect of a slight distortion of the inner of the rings in this case 13 as the two parts are forced together thus applying also radial compression to the material 16 lying radially outside the margin of the portion 3. Alternatively or additionally detent means can be used as seen in FIGS. 3 and 4. An annular bead 17 may be provided on one of the skirts for example skirt 13 of ring part 1 and one or more corresponding annular recesses at 18 on the skirt 14 of the ring part 2.

One of the ring parts preferably ring part 2 should be rigid and inextensible as possible being made for example of metal or plastics, possibly fibre-reinforced plastics. The inner ring will be of substantially rigid material nevertheless having some compliance, examples being nylon or a polyacetal such as Delrin (Registered Trade Mark). It will be seen that the rings when forced together form a closed frame around the outside of the element but do not touch it directly, compressing the flexible material evenly onto at least the axial faces of the element, avoiding stuffing, screwing or the setting up of potential leak paths.

The bead is fitted by first inserting the ring part 1 into the inlet 7 of the S, placing the eyepiece in the second inlet 9 of the S and then applying the second ring part 2 to the first ring part 1 by a direct axial movement, preferably with a constant pressure tool. The use of a constant pressure tool will ensure that if there are differences in size during a given run of materials, the pressure achieved between rubber portions 10 and 12 and the marginal portions 3 of the insert will be constant. This loading should preferably be such that the rubber in the loops 10 and 12 of the S is squeezed and displaced so that its thickness is reduced by between 10 and 20% of its original thickness.

The ring part 1 preferably has—as shown in FIGS. 2 and 3 but not in FIG. 1—a further and radially outwardly directed flange 19. The reason for this is to allow the ready release of the seal by insertion of some lever such as a screwdriver between the flange 19 and the exposed end of the skirt 14 so that the two parts of the ring may be pushed axially apart. It is to be noted that this does not involve any contact between the lever or tool and the flexible material.

Figure 5:
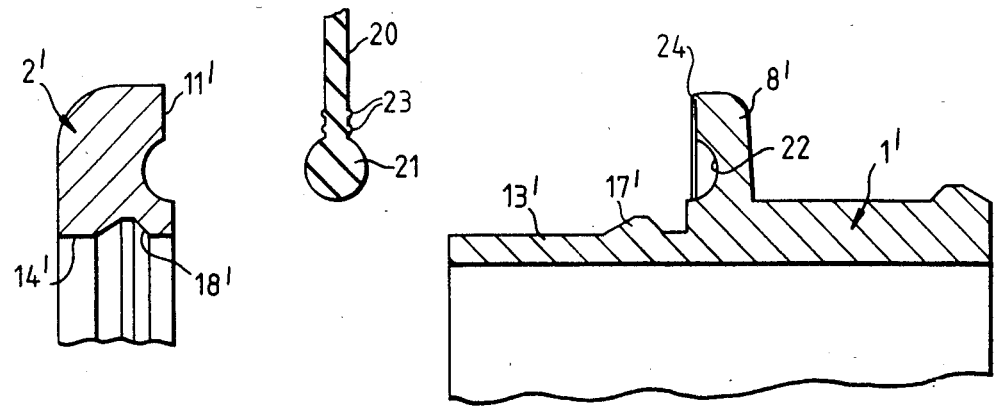
FIGS. 5 and 6 are exploded and assembled scrap-sections of a second version.
Figure 6:
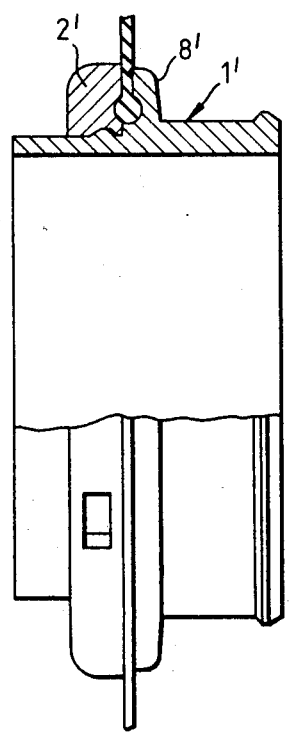
Figure 7:
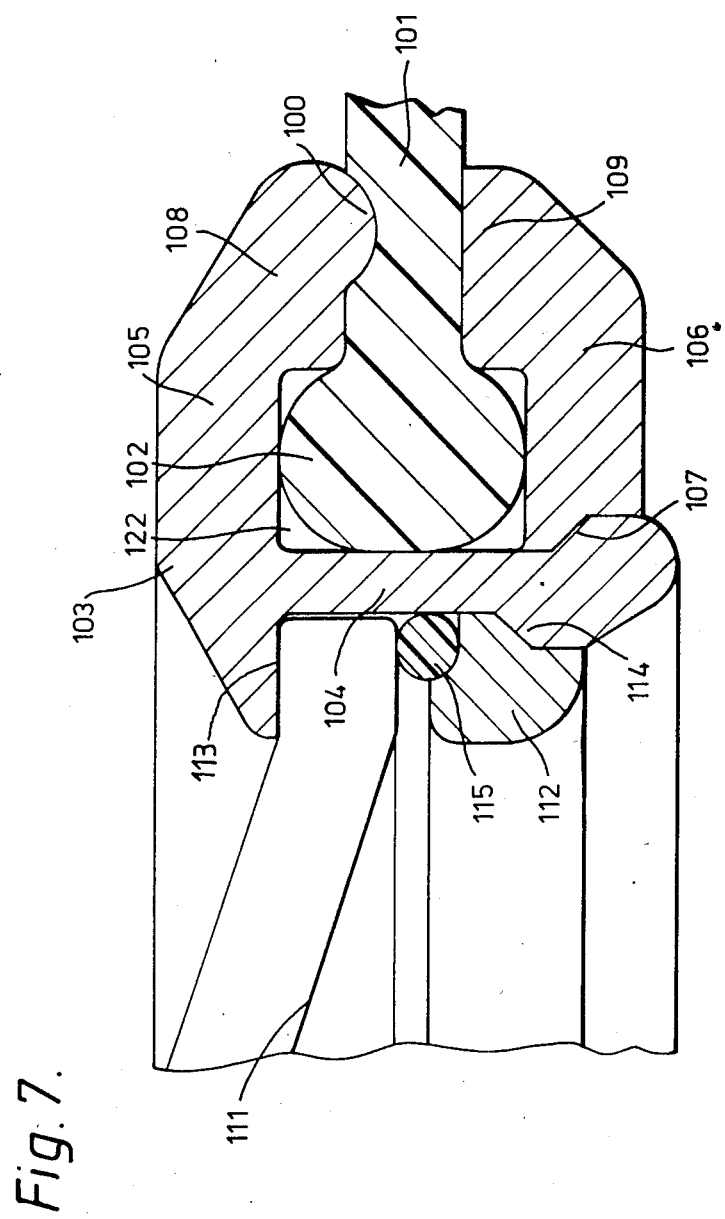
FIG. 7 shows in section a variant of the second version.

A second and at present preferred version is seen in FIGS. 5 to 7.

In FIG. 5 the first of the ring parts 1' is a rigid hollow cylindrical sleeve in which an element such as a valve of filter may be mounted. The radial flange 8' overlies one face of the edge 20 of the rubber material of the face piece of a respirator. This may have a bead 21 to assist location and which assists in manufacture of the face piece in injection processing), with an annular recess 22 in the flange 8' to accommodate it. Small ribs 23 on the edge 20 and narrow lip 24 in the flange may assist totally air-tight sealing of the edge to the flange 8' and to the flange 11' of the ring part 2'. The axial surface 14' of that ring part is an interference fit with the axial wall 13' of the first ring part 1', and location of the rings in an axially assembled condition seen in FIG. 6, where the rubber edge 20 is squeezed by about 10%–20% of its original thickness is assisted by detent means 17', 18', namely coacting rib 17' and recess 18' on the axial faces. The bead 21 is also compressed in the compartment formed by the recess 22.

Whereas ring 1' is as rigid and inextensible as possible, the ring 2' is of a more compliant material such as polyacetal as in the first version. Also as before, fitting of the rings is by a solely axial pressure, applied as evenly as possible to the ring 2' until it snaps onto position. To maintain a seal even if the rubber creeps or sets, the position which would be adopted as a result of the interaction of the detent means in the absence of any flexible material between the flanges is one of slightly closer axial approach than that which is actually achieved, even though the detent means are engaged, when the desired degree of compression has been exerted on the flexible material between the flanges. Thus, if there is any setting of the flexible material, the rings will tend to approach closer and maintain a desired sealing pressure.

In the variant of the second version seen in FIG. 7, a flexible face mask of a respirator has holes for the insertion of rigid eyepieces. At the edge of each hole the material 101 of the face mask has a bead portion 102 of increased thickness. A first ring part 103 of an insert for the holding of the eyepiece has an axially extending wall 104 passing through the hole in the material 101 and a radially extending flange 105 which overlies the material 101 adjacent to the hole. The flange 105 is in this instance intended to be at that surface of the mask which is nearer the wearer, though the opposite orientation is equally possible. The flanges and the wall are all endless (continuous).

A second ring part 106 overlies the material 101 on the other side from the radial flange 105. The second part 106 is restrained from moving axially away from the radial flange 105 by an oversize detent 107 on the axial wall 104 of the first ring 103. The second part 106 has no axial wall, but an axially extending inner peripheral surface.

The radial flanges 105 and 106 have opposed portions 108, 109 extending towards each other at a distance from the axial wall 104. This creates a compartment 122 for the bead portion 102 of the material 101 of the face piece respirator. The compartment is slightly oversize for the bead so that the latter may be deformed upon the exertion of axial pressure on it, when the parts are in a desired axial relationship, at which time also the material 101 is pressed directly between the portions 108, 109 and thereby sealed to them and held very securely. To increase the security of the clamping and to further ensure a fluid tight seal between the material 101 and the first ring 103, the portion 108 of the radial flange 105 which extends towards the portion 109 of the second ring 106 has a radially narrow endless ridge 100 extending yet further towards the portion 109. The material 101 is locally compressed and/or displaced by this ridge 100.

The eyepiece 111 is secured to the first ring 103 in an analogous manner, by a third ring component 112.

The first ring 103 has a stop 113 and a detent 114 extending radially inward from the wall and axially spaced from each other. The eyepiece 111 is located against the stop 113, and is held in place by the presence of the third component 112 which is restrained from movement away from the detent 113 and the lens 111 by the undersized detent 14.

An O-ring 115 compressed between the lens 111 and the third ring 112 ensures a fluid tight seal behind the eyepiece. Thus the aperture in the face mask is sealed overall in a fluid tight manner. The sealing ring 115 could be replaced or supplemented by another resilient seal such as a gasket or packing between the lens and the third ring by a sealing ring or gasket between the lens 111 and the stop 113.

With this construction the second part 106 is put in place by axially directed pressure with no rotation about the axis of the insert. Therefore this construction shares the advantage of the first version. The rigid eyepiece may be fitted by tilting it into one corner between the stop 113 and the wall 104 and passing it over the diametrically opposite portion of the detent 114, and the somewhat softer third component 112 (e.g. of Delrin) can be forced axially past the undersize detent after the attitude of the eyepiece has been chosen by rotating it. This fixing does not require any complicated special shaping of the flexible material at the edge of the hole. In the example shown in the drawing the insert does not protrude greatly on the inside of the respirator (the top side on the drawing) and has a bevelled profile, so that it has a reduced tendency to irritate the wearer.

The eyepiece can be removed and replaced without detaching the first and second parts from the material. It is only necessary to remove the third ring 112, which can be located on the outside of a respirator eyepiece, for easy access.

One advantage is some applications of locating the third ring on the outside is that the force from any accidental impact on the outside of the eyepiece is transmitted directly to the integral stop in the first component, reducing the likelihood of the eyepiece being knocked out.

I claim:

1. A rigid insert for fixing in an orifice which is bounded by an endless edge of flexible material, wherein the rigid insert has two radially extending endless flanges, borne respectively on discrete parts of the insert, at least one of the parts having an axially extending endless wall, the parts being constructed and arranged to be brought into an axial relationship wherein their flanges entrap between them and exert an axial pressure on at least an edge portion of the flexible material by axial movement of one of the parts over the axial wall of the other, each part having an inclined surface, the parts then being retained in that relationship by interengagement between the parts through interengagement of said inclined surfaces, one on each part and tending to establish a preferred relative axial position of the two parts, the relative axial position being one of greater axial approach of the flanges than that at which the said axial pressure occurs.

2. An insert according to claim 1, wherein the endless edge of the flexible material is defined by a bead integrally formed of the material, and at least one of the flanges of the parts includes an endless recess for accommodating the bead while permitting axial compression of the bead in the said axial relationship.

3. An insert according to claim 2 wherein at least one of the edge portion of the flexible material and the flanges includes an endless radially narrow compression rib to apply over a narrow annulus a pressure in the flexible material greater than the said axial pressure.

4. An insert according to claim 1 wherein the axial wall of the insert lies radially within the edge portion of the flexible material and the flanges extend radially outwardly over that edge portion, and one of the said parts is an integral portion of a subassembly occupying and sealing the orifice when the insert is so fixed.

5. An insert according to claim 1, wherein the axial wall of the insert lies radially within the edge portion of the flexible material and the flanges extend radially outwardly over that edge portion, and one of the said parts provides a housing for a discrete subassembly, has stop means against which the subassembly is to abut, and has compression means for urging the subassembly in fluid tight manner against the stop means.

6. An insert according to claim 5 wherein the compression means includes a resilient endless sealing ring against one face of the subassembly, and a compression ring lodged against the inner periphery of the axial wall to cause sealing engagement between the sealing ring and the subassembly.

7. An insert according to claim 6 wherein the compression ring is an endless ring engageable against the axial wall and positioned by a endless detent to maintain it normal to the axis and to react against inward deformation of the axial wall.

8. An insert as claimed in claim 1 wherein at least one of said parts is slightly resilient, and the fit of one over the axial wall of the other part is a snap fit over surface configurations permitting relative axial movement in engaging and disengaging directions under axial pressure sufficient to snap one part into or out of engagement with the other.

9. A rigid insert for fixing in an orifice which is bounded by an endless edge of flexible material, wherein the rigid insert has two radially extending endless flanges borne respectively on discrete parts of the insert, at least one of the parts having an axially extending endless wall, the parts being constructed and arranged to be brought into an axial relationship wherein their flanges entrap between them and exert an axial pressure on two thicknesses of an edge portion of the flexible material which lie over both faces of an edge portion of a rigid subassembly mounted by the insert, the edge portion of the flexible material passing around the outside of that edge portion of the subassembly, the parts being so brought into axial relationship by axial movement by one of the parts over the axial wall of the other and then being retained in that relationship by interengagement between the parts.

10. In combination, a rigid insert mounted in an orifice in a flexible material, said orifice having an endless margin, and a subassembly mounted in said rigid insert, wherein said rigid insert comprises two parts each having a radial flange and at least one of said parts having a continuous axial wall, the margin of said flexible material being compressed between said flanges, one of said parts being penetrated by the said axial wall of the other of the parts and interengaging means on the parts holding said parts in an axial relationship exerting the compression, at least one of said parts being slightly resilient, the fit of one part over the axial wall of the other part being a snap fit over surface configurations permitting relative axial movement in engaging and disengaging directions under axial pressure sufficient to snap one part into or out of interengagement with the other, said subassembly being mounted radially within said penetrating axial wall and retained axially by a second flange on said part having said axial wall, said second flange projecting radially inwardly of said wall, and a retaining ring radially within said wall and interengaging therewith to exert compression on said subassembly against said second flange, said retaining ring being softer than the other parts, the interengagement of said interengaging means and of said retaining ring with said wall being effected without requiring relative rotation as would be necessary for screw threaded interengagements.

11. The combination of claim 10 wherein a sealing ring is engaged between at least one face of the subassembly and one of the members between which it is retained.

12. The combination according to claim 10 wherein said interengements of said parts and of said retaining ring with the said wall are through respectively inclined surfaces urging said interengagements in a direction of increased compression.

13. The combination as claimed in claim 10 wherein said retaining ring is slightly resilient and is a snap fit with said wall over surface configurations permitting relative axial movement in engaging and disengaging directions under axial pressure sufficient to snap the retaining ring into or out of interengagement with the wall.

14. A method of fixing a rigid insert within an orifice which is bounded by an endless edge of flexible material wherein the rigid insert has two radially extending endless flanges borne respectively on discrete parts of the insert, at least one of the parts having an axially extending endless wall, comprising bringing the parts into an axial relationship wherein their flanges entrap between them and exert an axial pressure on at least an edge portion of the flexible material by axial movement of one of the parts over the axial wall of the other, and retaining the parts in that relationship by interengagement between mutually inclined walls on the said parts whereby the flanges continuously tend to be urged toward each other and to be located closer to each other than at least initially permitted by the flexible material.

15. A method of fixing a subassembly into an orifice which is bounded by an endless edge of flexible material by using a rigid insert, wherein the rigid insert has two radially extending endless flanges borne respectively on discrete parts of the insert, at least one of the parts having an axially extending endless wall, comprising bringing the parts into an axial relationship wherein their flanges entrap between them and exert an axial pressure on an edge flange of the subassembly through two layers of an edge portion of the flexible material which is wrapped around the outside of the edge flange, by axial movement of one of the parts over the axial wall of the other and retaining the parts in that relationship by interengagement between them.

* * * * *